US009268940B1

(12) United States Patent
Wilhelm et al.

(10) Patent No.: US 9,268,940 B1
(45) Date of Patent: Feb. 23, 2016

(54) SYSTEMS AND METHODS FOR ASSESSING INTERNET ADDRESSES

(71) Applicant: Symantec Corporation, Mountain View, CA (US)

(72) Inventors: Jeffrey Wilhelm, Venice, CA (US); Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 192 days.

(21) Appl. No.: 13/796,109

(22) Filed: Mar. 12, 2013

(51) Int. Cl.
*G06F 11/00* (2006.01)
*G06F 21/57* (2013.01)

(52) U.S. Cl.
CPC ...................................... *G06F 21/57* (2013.01)

(58) Field of Classification Search
CPC .............. G06F 21/577; G06F 21/6245; H04L 41/0659
See application file for complete search history.

(56) References Cited

U.S. PATENT DOCUMENTS

| 7,028,335 | B1 * | 4/2006 | Borella et al. ................... 726/11 |
| 7,360,251 | B2 * | 4/2008 | Spalink et al. ................... 726/26 |
| 7,865,953 | B1 * | 1/2011 | Hsieh et al. ...................... 726/22 |
| 8,156,558 | B2 * | 4/2012 | Goldfeder et al. ............... 726/25 |
| 8,615,800 | B2 * | 12/2013 | Baddour et al. ................. 726/22 |
| 2006/0075494 | A1 * | 4/2006 | Bertman ............... G06F 21/552 726/22 |
| 2006/0206715 | A1 * | 9/2006 | Cowan et al. .................. 713/176 |
| 2008/0244748 | A1 * | 10/2008 | Neystadt ............. H04L 63/1425 726/25 |
| 2012/0079592 | A1 * | 3/2012 | Pandrangi ............... H04L 47/10 726/22 |

OTHER PUBLICATIONS

MAILJET; Why You Should Keep Your Spam Rate Below 0.1%; http://blog.mailjet.com/post/22263862204/keep-your-spam-rate-below-0-1; As accessed on Dec. 14, 2012.

* cited by examiner

*Primary Examiner* — Mohammad W Reza
*Assistant Examiner* — Khoi Le
(74) *Attorney, Agent, or Firm* — ALG INTELLECTUAL PROPERTY, LLC

(57) ABSTRACT

A computer-implemented method for assessing Internet addresses may include (1) identifying an Internet Protocol address, (2) identifying a plurality of files downloaded from the Internet Protocol address, (3) generating an aggregation of security assessments that relates to the Internet Protocol address and that may be based at least in part on a security assessment of each of the plurality of files, (4) determining a trustworthiness of the Internet Protocol address based at least in part on the aggregation of security assessments and (5) facilitating a security action based at least in part on the trustworthiness of the Internet Protocol address. Various other methods, systems, and computer-readable media are also disclosed.

18 Claims, 7 Drawing Sheets

SYSTEMS AND METHODS FOR ASSESSING INTERNET ADDRESSES

BACKGROUND

People increasingly rely on the Internet for business and personal use. Unfortunately, the Internet has become a major vector for malware propagation. While Internet users may reduce the risk of encountering malware by only visiting reputable Internet sites, the ever-growing volume of Internet sites, including many niche sites, may mean that user wariness is impractical as a total solution.

Unfortunately, traditional attempts by security vendors to identify malicious Internet sites may also suffer from significant deficiencies. For example, some security vendors may track and analyze uniform resource locators to identify potentially malicious sites. However, malware distributors may constantly create new uniform resource locators with modified content, potentially frustrating any attempt to maintain comprehensive blacklists. Furthermore, techniques such as crawling web sites may not scale well and may be subject to evasion when a malicious uniform resource locator serves benign content to certain requestors (e.g., address ranges belonging to security vendors) and malicious content to others.

Accordingly, the instant disclosure identifies and addresses a need for additional and improved systems and methods for assessing Internet addresses.

SUMMARY

As will be described in greater detail below, the instant disclosure generally relates to systems and methods for assessing Internet addresses by aggregating security assessments of files that have been downloaded from Internet Protocol addresses and determining the trustworthiness based on the aggregation of security assessments.

In one example, a computer-implemented method for assessing Internet addresses may include (1) identifying an Internet Protocol address, (2) identifying a plurality of files downloaded from the Internet Protocol address, (3) generating an aggregation of security assessments that relates to the Internet Protocol address and that may be based at least in part on a security assessment of each of the plurality of files, (4) determining a trustworthiness of the Internet Protocol address based at least in part on the aggregation of security assessments and (5) facilitating a security action based at least in part on the trustworthiness of the Internet Protocol address.

In some examples, generating the aggregation of security assessments may include (1) identifying a plurality of Internet sites that operate from the Internet Protocol address and (2) determining a distribution identifying how the security assessments are distributed across the plurality of Internet sites.

In some examples, determining the trustworthiness of the Internet Protocol address based on the aggregation of security assessments may include determining, based on the distribution, which of the Internet Protocol address and at least one of the plurality of Internet sites to convict as untrustworthy.

In some examples, determining the trustworthiness of the Internet Protocol address based on the aggregation of security assessments may include determining, based on the distribution, that a diffusion of negative security assessments across the plurality of Internet sites exceeds a predetermined threshold.

In some examples, determining the trustworthiness of the Internet Protocol address based on the aggregation of security assessments may include (1) determining that a subset of the plurality of Internet sites accounts for at least a predetermined amount of usage of the Internet Protocol address and (2) determining, based on the distribution, that a concentration of negative security assessments within the subset of the plurality of Internet sites falls below a predetermined threshold.

In some examples, determining the trustworthiness of the Internet protocol address may be further based on (1) identifying an amount of time that at least one Internet site has operated from the Internet Protocol address and (2) determining that the amount of time falls below a predetermined threshold.

In some examples, identifying the Internet Protocol address may include determining that the Internet Protocol address may be externally routable.

In one embodiment, a system for implementing the above-described method may include (1) an identification module programmed to (i) identify an Internet Protocol address and (ii) the identification module may be programmed to identify a plurality of files downloaded from the Internet Protocol address, (2) a generation module programmed to generate an aggregation of security assessments that relates to the Internet Protocol address and that may be based at least in part on a security assessment of each of the plurality of files, (3) a determination module programmed to determine a trustworthiness of the Internet Protocol address based at least in part on the aggregation of security assessments, (4) a facilitation module programmed to facilitate a security action based at least in part on the trustworthiness of the Internet Protocol address and (5) at least one processor configured to execute the identification module, the generation module, the determination module and the facilitation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an Internet Protocol address, (2) identify a plurality of files downloaded from the Internet Protocol address, (3) generate an aggregation of security assessments that relates to the Internet Protocol address and that may be based at least in part on a security assessment of each of the plurality of files, (4) determine a trustworthiness of the Internet Protocol address based at least in part on the aggregation of security assessments and (5) facilitate a security action based at least in part on the trustworthiness of the Internet Protocol address.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
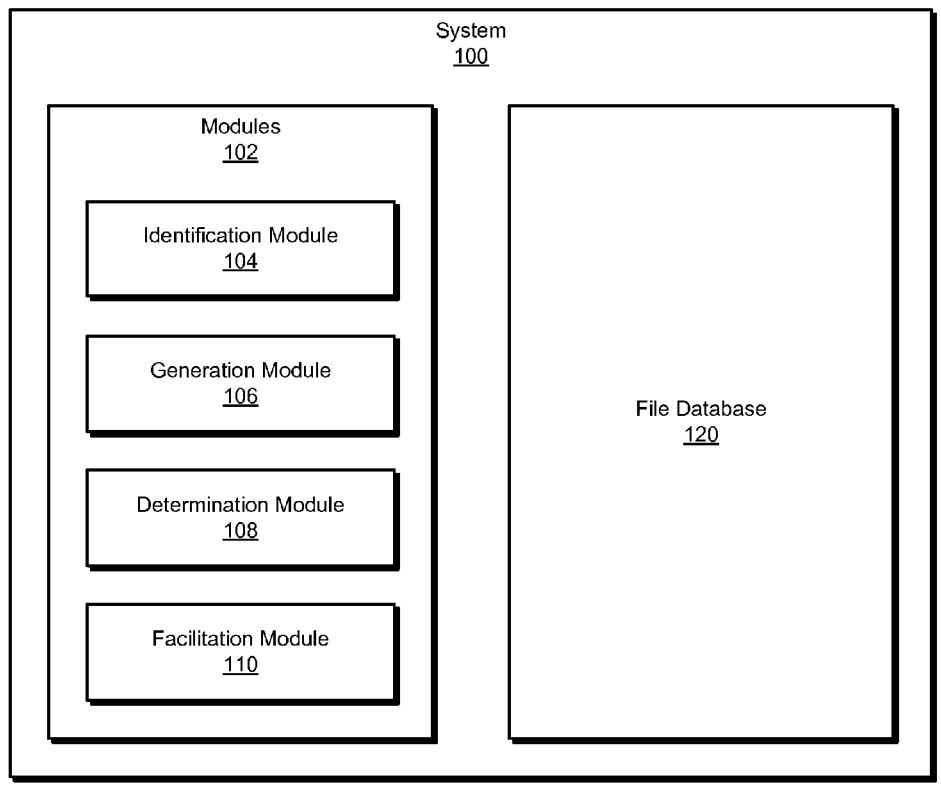
FIG. 1 is a block diagram of an exemplary system for assessing Internet addresses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for assessing Internet addresses. As will be explained in greater detail below, by aggregating security assessments of files that have been downloaded from Internet Protocol addresses and determining the trustworthiness based on the aggregation of security assessments, the systems and methods described herein may improve the accurate identification of malicious Internet Protocol addresses, web sites, and/or files.

Figure 2:
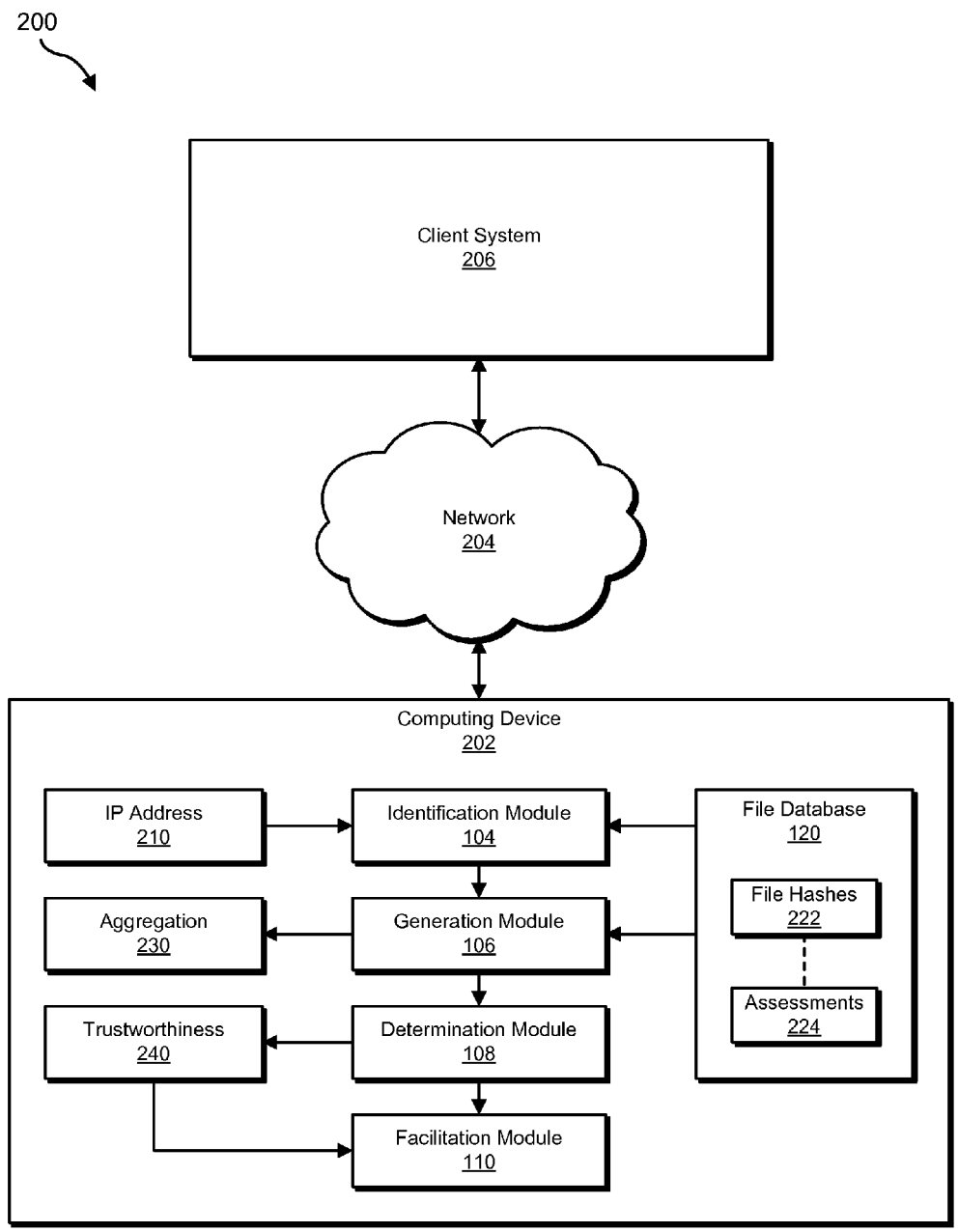
FIG. 2 is a block diagram of an exemplary system for assessing Internet addresses.

The following will provide, with reference to FIGS. 1-2, detailed descriptions of exemplary systems for assessing Internet addresses. Detailed descriptions of corresponding computer-implemented methods will also be provided in connection with FIG. 3. Detailed descriptions of exemplary Internet Protocol addresses will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for assessing Internet addresses. As illustrated in this figure, exemplary system 100 may include one or more modules 102 for performing one or more tasks. For example, and as will be explained in greater detail below, exemplary system 100 may also include an identification module 104 programmed to (1) identify an Internet Protocol address and (2) identify a plurality of files downloaded from the Internet Protocol address. Exemplary system 100 may additionally include a generation module 106 programmed to generate an aggregation of security assessments that relates to the Internet Protocol address and that is based at least in part on a security assessment of each of the plurality of files. Exemplary system 100 may also include a determination module 108 programmed to determine a trustworthiness of the Internet Protocol address based at least in part on the aggregation of security assessments. Exemplary system 100 may additionally include a facilitation module 110 programmed to facilitate a security action based at least in part on the trustworthiness of the Internet Protocol address. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information about one or more files downloaded from one or more IP addresses, including, in some examples, security assessments of the one or more files.

Database 120 may represent portions of a single database or computing device or a plurality of databases or computing devices. For example, database 120 may represent a portion of computing device 202 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 via a network 204. For example, computing device 202 may represent a security server configured to generate and/or provide security information about IP addresses, Internet sites, and/or downloadable files to clients such as client system 206. Computing device 202 may be programmed with one or more of modules 102 and/or may store all or a portion of the data in database 120. Additionally or alternatively, client system 206 may be programmed with one or more of modules 102.

In one embodiment, one or more of modules 102 from FIG. 1 may, when executed by at least one processor of computing device 202 and/or client system 206, facilitate computing device 202 and/or client system 206 in assessing Internet addresses. For example, and as will be described in greater detail below, one or more of modules 102 may cause computing device 202 and/or client system 206 to assess an IP address 210. For example, and as will be described in greater detail below, identification module 104 may be programmed to identify IP address 210. Identification module 104 may also be programmed to identify a plurality of files (e.g., represented by file hashes 222 in file database 120) downloaded from IP address 210. Generation module 106 may be programmed to generate an aggregation 230 of security assessments that relates to IP address 210 and that is based at least in part on assessments 224 of file hashes 222. Determination module 108 may be programmed to determine a trustworthiness 240 of IP address 210 based at least in part on the aggregation 230 of security assessments 224. Facilitation module 110 may be programmed to facilitate a security action (e.g., performed by and/or for client system 206) based at least in part on trustworthiness 240 of IP address 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Client system 206 generally represents any type or form of computing device capable of reading computer-executable instructions. Examples of client system 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and client system 206.

Figure 3:
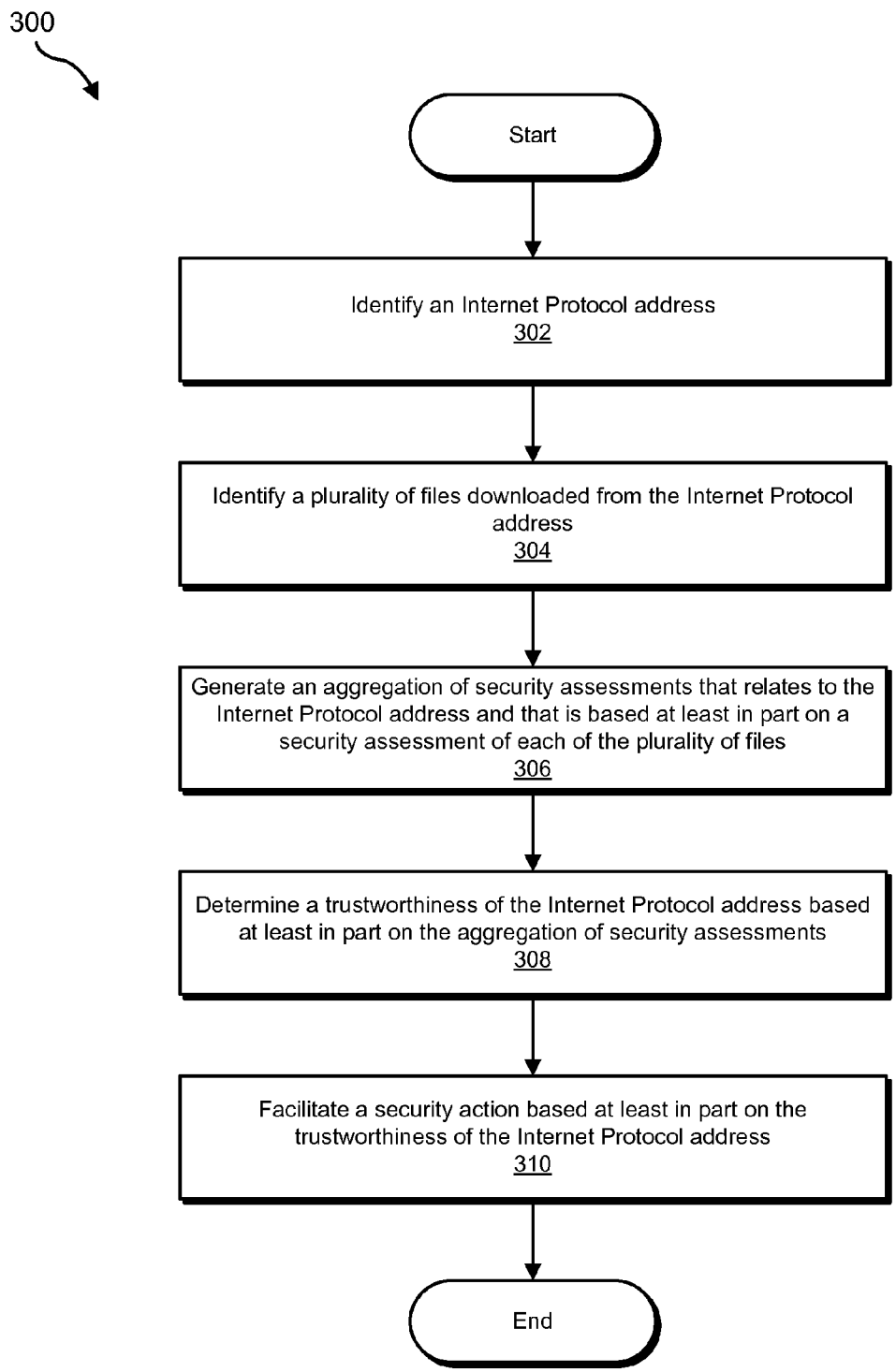
FIG. 3 is a flow diagram of an exemplary method for assessing Internet addresses.

FIG. 3 is a flow diagram of an exemplary computer-implemented method 300 for assessing Internet addresses. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an Internet Protocol address. For example, at step 302 identification module 104 may, as part of computing device 202 in FIG. 2, identify IP address 210.

As used herein, the phrase "Internet Protocol address" (or "IP address") may refer to any numerical designation of a device configured to communicate via a network (e.g., using the Internet Protocol). Examples of Internet Protocol addresses include, without limitation, Internet Protocol version 4 addresses and Internet Protocol version 6 addresses.

Identification module 104 may identify the Internet Protocol address in any of a variety of contexts. For example, identification module 104 may identify the Internet Protocol address by receiving a request from a client system to provide information about the trustworthiness of the Internet Protocol address (e.g., so that the client system may determine whether to block the Internet Protocol address and/or a file that has originated from the Internet Protocol address). Additionally or alternatively, identification module 104 may identify the Internet Protocol address within an Internet usage history of one or more client systems. In some examples, identification module 104 may identify the Internet Protocol address by determining that one or more Internet sites subject to security assessments operate from the Internet Protocol address.

In some examples, identification module 104 may, as a part of identifying the Internet Protocol address, determine that the Internet Protocol address is externally routable. In some examples, Internet Protocol addresses used for intranet traffic may not represent a unified location across disparate networks, and, accordingly, identification module 104 may ensure that the systems and methods described herein only assess externally routable Internet Protocol addresses. For example, identification module 104 may determine that the Internet Protocol address is not within an Internet Protocol address range that is listed as non-routable (e.g., addresses within 192.168.*.*, addresses within 10.*.*.*, etc.).

Figure 4:
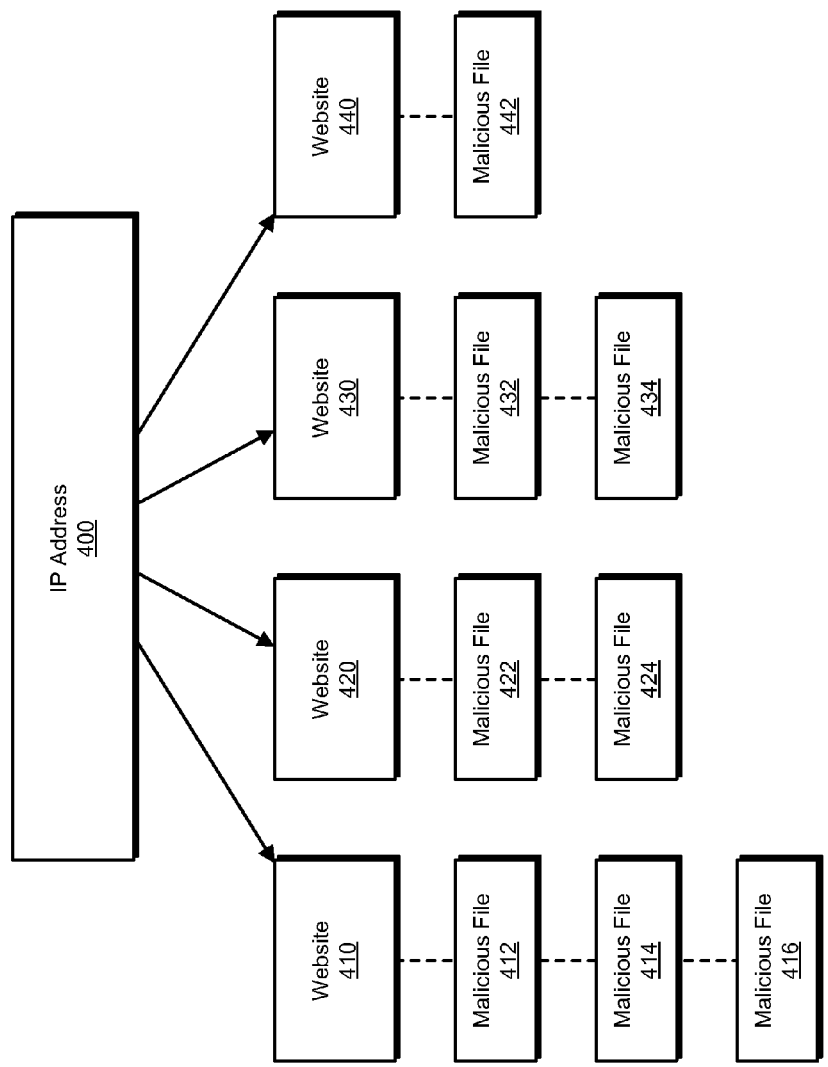
FIG. 4 is a diagram of an exemplary Internet Protocol address.

FIG. 4 is a block diagram of an exemplary IP address 400. As shown in FIG. 4, websites 410, 420, 430, and 440 may operate from IP address 400. Using FIG. 4 as an example, at step 302 identification module 104 may identify IP address 400.

Returning to FIG. 3, at step 304 one or more of the systems described herein may identify a plurality of files downloaded from the Internet Protocol address. For example, at step 304 identification module 104 may, as part of computing device 202 in FIG. 2, identify a plurality of files (e.g., represented by file hashes 222 in file database 120) downloaded from IP address 210.

As used herein, the term "file" may refer to any identifiable unit of data that may originate from an IP address and that may pose a security risk. Examples of files include, without limitation, files, documents, and data streams.

Identification module 104 may identify the plurality of files in any suitable manner. For example, identification module 104 may identify the plurality of files by identifying fingerprints corresponding to the plurality of files (e.g., a database of hashes of the plurality of files) and associated with the Internet Protocol address. For example, identification module 104 may perform a database query using the IP address and receive records of the plurality of files (e.g., including a security assessment for each file) in response.

Identification module 104 may identify the plurality of files in any suitable context. For example, one or more systems may collect data about downloaded files from a pool of client systems (e.g., that are registered with a security service), including the IP addresses and the uniform resource locators ("URLs") from which the files were downloaded (and, e.g., the time of the download for each file, a globally unique identifier for the user that downloaded the file and/or submitted the information about the file, etc.). In some examples, these systems may then identify all submissions about files from a predefined time window (e.g., the past 6 months). These systems may also retrieve up-to-date reputation information for each file within the time window (e.g., from a security database, based on the hash of each file and/or from a security assessment by a submitting client system). The reputation information for a file may include any information regarding the trustworthiness of the file and/or one or more security assessments of the file (e.g., each file may be rated as "known good," "known bad," "suspected good," "suspected bad," "unknown," etc.). By using up-to-date reputation information for files, the systems and methods described herein may more accurately assess IP addresses based on the files downloaded from the IP addresses.

Using FIG. 4 as an example, identification module 104 may identify malicious files 412, 414, 416, 422, 424, 432, 434, 442 downloaded from IP address 400 (e.g., via websites 410, 420, 430, and 440).

Returning to FIG. 3, at step 306 one or more of the systems described herein may generate an aggregation of security assessments that relates to the Internet Protocol address and that is based at least in part on a security assessment of each of the plurality of files. For example, at step 306 generation module 106 may, as part of computing device 202 in FIG. 2, generate aggregation 230 of security assessments that relates to IP address 210 and that is based at least in part on assessments 224 of file hashes 222.

As used herein, the phrase "security assessment" may refer to any suitable result of a security analysis, and/or scan. For example, the security assessment may include the result of a malware scan, an intrusion prevention analysis, etc. In some examples, the security assessment may include the result of a behavioral heuristic and/or analysis. In some examples, the security assessment may include an aggregate reputation of a file (e.g., from many contributing client systems) based on past observed behaviors and/or origins of the file. As used herein, the term "malware" may refer to any virus, worm, Trojan horse, spyware, and/or any other malicious, illegitimate, unstable, insecure, and/or unauthorized software and/or data object.

Generation module 106 may generate the aggregation of security assessments in any of a variety of ways. For example, generation module 106 may calculate the total number of files downloaded from the Internet Protocol address and calculate the proportion of the files that fall in each of a number of reputation tiers. For example, generation module 106 may calculate what proportion of the files downloaded from the Internet Protocol address are "known good" files, "known bad" files, "good with high certainty" files, "good with medium certainty" files, "good with low certainty files," "bad with low certainty" files, "bad with high certainty" files, "unknown" files, etc. By aggregating security assessments in terms of proportions of different assessments, generation module 106 may normalize security assessment data for Internet Protocol addresses such that Internet Protocol addresses may be meaningfully compared based on the files downloaded from the Internet Protocol addresses.

In some examples, generation module 106 may generate the aggregation of security assessments by taking into account distinct Internet sites from which the plurality of files were downloaded. For example, generation module 106 may identify a plurality of Internet sites that operate from the Internet Protocol address and determine a distribution identifying how the security assessments are distributed across the plurality of Internet sites. As used herein, the phrase "Internet site" may refer to any site under the control of a distinct entity, group, and/or system. Generation module 106 may identify the plurality of Internet sites in any suitable manner. For example, generation module 106 may identify the plurality of Internet sites by identifying a uniform resource locator by which each file in the plurality of files was accessed. In some examples, one or more of the systems described herein may identify an Internet site based on a domain of a uniform resource locator (e.g., these systems may regard a file that was downloaded from "www.example.com/downloads/file.exe" as belonging to the Internet site "example.com"). Additionally or alternatively, one or more of the systems described herein may identify an Internet site based on a broadest possible sub-domain and/or sub-path that is under the control of a single entity. For example, these systems may regard a file that was downloaded from "www.example.com/~john/files/a.exe" as belonging to the Internet site "www.example.com/~john".

Generation module 106 may determine the distribution of the security assessments across the plurality of Internet sites in any of a variety of ways. For example, generation module 106 may determine what number of known malicious files were downloaded from each of the plurality of Internet sites. Additionally or alternatively, generation module 106 may determine what proportion of files downloaded from each of the plurality of Internet sites were known malicious files (e.g., versus a proportion of known good files, unknown files, etc.).

In some examples, generation module 106 may aggregate additional data relating to the plurality of files downloaded from the Internet Protocol address. For example, generation module 106 may aggregate information describing what proportion of file downloads were digitally signed, how many unique files are available at each Internet Protocol address and/or Internet site, how many unique samples of known malware have been observed at each Internet Protocol address and/or Internet site, and/or how many distinct users have downloaded one or more files from each Internet Protocol address and/or Internet site. In some examples, one or more of the systems described herein may make a trustworthiness determination about the Internet Protocol address based on one or more of these aggregated additional data.

Using FIG. 4 as an example, generation module 106 may aggregate the security assessments for malicious files 412, 414, 416, 422, 424, 432, 434, 442 downloaded from IP address 400 by creating a count of these malicious files. Additionally or alternatively, generation module 106 may aggregate the security assessments for these malicious files by calculating the proportion of these malicious files out of all files downloaded from IP address 400. In some examples, generation module 106 may aggregate the security assessments by determining how these malicious files are distributed across websites 410, 420, 430, and 440. For example, generation module 106 may calculate the proportion of malicious files out of all files downloaded from websites 410, 420, 430, and 440, respectively.

Returning to FIG. 3, at step 308 one or more of the systems described herein may determine a trustworthiness of the Internet Protocol address based at least in part on the aggregation of security assessments. For example, at step 308 determination module 108 may, as part of computing device 202 in FIG. 2, determine trustworthiness 240 of IP address 210 based at least in part on the aggregation 230 of security assessments 224.

As used herein, the term "trustworthiness" may refer to any classification, rating, and/or description that describes an Internet Protocol address, Internet site, and/or file. In some examples, the trustworthiness of an Internet Protocol address, Internet site, and/or file may precipitate a security action designed to protect a computing system from the Internet Protocol address, Internet site, and/or file and/or a related Internet Protocol address, Internet site, and/or file. In some examples, determination module 108 may determine that the Internet Protocol address is untrustworthy. Alternatively, determination module 108 may determine that the Internet Protocol address is trustworthy.

Determination module 108 may determine the trustworthiness of the Internet Protocol address in any suitable manner. For example, determination module 108 may determine that a large number and/or proportion of known bad files downloaded from the Internet Protocol address indicates that the Internet Protocol address is untrustworthy. Likewise, determination module 108 may determine that a large number and/or proportion of known good files downloaded from the Internet Protocol address indicates that the Internet Protocol address is trustworthy.

As mentioned earlier, in some examples, one or more of the systems described herein may identify a plurality of Internet sites that operate from the Internet Protocol address and determine a distribution identifying how the security assessments are distributed across the plurality of Internet sites. In these examples, determination module 108 determine, based on the distribution, which of the Internet Protocol address and one or more of the plurality of Internet sites to convict as untrustworthy.

In some examples, determination module 108 may determine, based on the distribution, that a diffusion of negative security assessments across the plurality of Internet sites exceeds a predetermined threshold. For example, depending on how the security assessments are distributed across the plurality of Internet sites, determination module 108 may determine that the IP address as a whole is untrustworthy. In another example, determination module 108 may determine that one or more of the plurality of Internet sites are untrustworthy, and that IP address is not, on the whole, untrustworthy. For example, if a large proportion of the Internet sites that operate from the IP address are trustworthy (e.g., based in part on delivering known good files rather than known bad files), determination module 108 may convict Internet sites that operate from the IP address on an individual basis. However, if a large proportion of the Internet sites are untrustworthy (e.g., based in part on delivering a relatively high proportion of known bad files and/or based in part on delivering any known bad files), determination module 108 may convict the IP address as untrustworthy.

In some examples, determination module 108 may determine that a subset of the plurality of Internet sites accounts for at least a predetermined amount of usage of the Internet Protocol address. Determination module 108 may further determine, based on the distribution, that a concentration of negative security assessments within the subset of the plurality of Internet sites falls below a predetermined threshold. For example, determination module 108 may determine that two Internet sites within the plurality of Internet sites account for over 80% of traffic from the Internet Protocol address while more than 200 Internet sites account for the remaining 20% of traffic from the Internet Protocol address. However, only 10% of negative security assessments of files (e.g., files categorized as "known bad files") may pertain to the two largest Internet sites while the remaining 90% of negative security assessments of files may pertain to the more than 200 smaller Internet sites. Accordingly, determination module 108 may not determine that the IP address is untrustworthy, but instead may determine that several of the 200 smaller Internet sites are untrustworthy.

In some examples, determination module 108 may determine that only one Internet site operates from the Internet Protocol address. In these examples, determination module 108 may determine that the Internet Protocol address is not untrustworthy, but instead that the Internet site is untrustworthy.

Using FIG. 4 as an example, website 410 may have 100 file downloads in a 6-month period, including three known malicious files (malicious files 412, 414, and 416). Website 420 may have 80 file downloads in the 6-month period, including two known malicious files (malicious files 422 and 424). Website 430 may have 70 file downloads in the 6-month period, including two known malicious files (malicious files 432 and 434). Website 440 may have 60 file downloads in the 6-month period, including one known malicious file (malicious file 442). In this example, determination module 108 may determine, based on the proportion of malicious files downloaded from IP address 400 in the 6-month period, based on the relative diffusion of observed malicious files across websites 410, 420, 430, and 440, and based on no large, trusted websites operating from IP address 400, that IP address 400 is untrustworthy.

Figure 5:
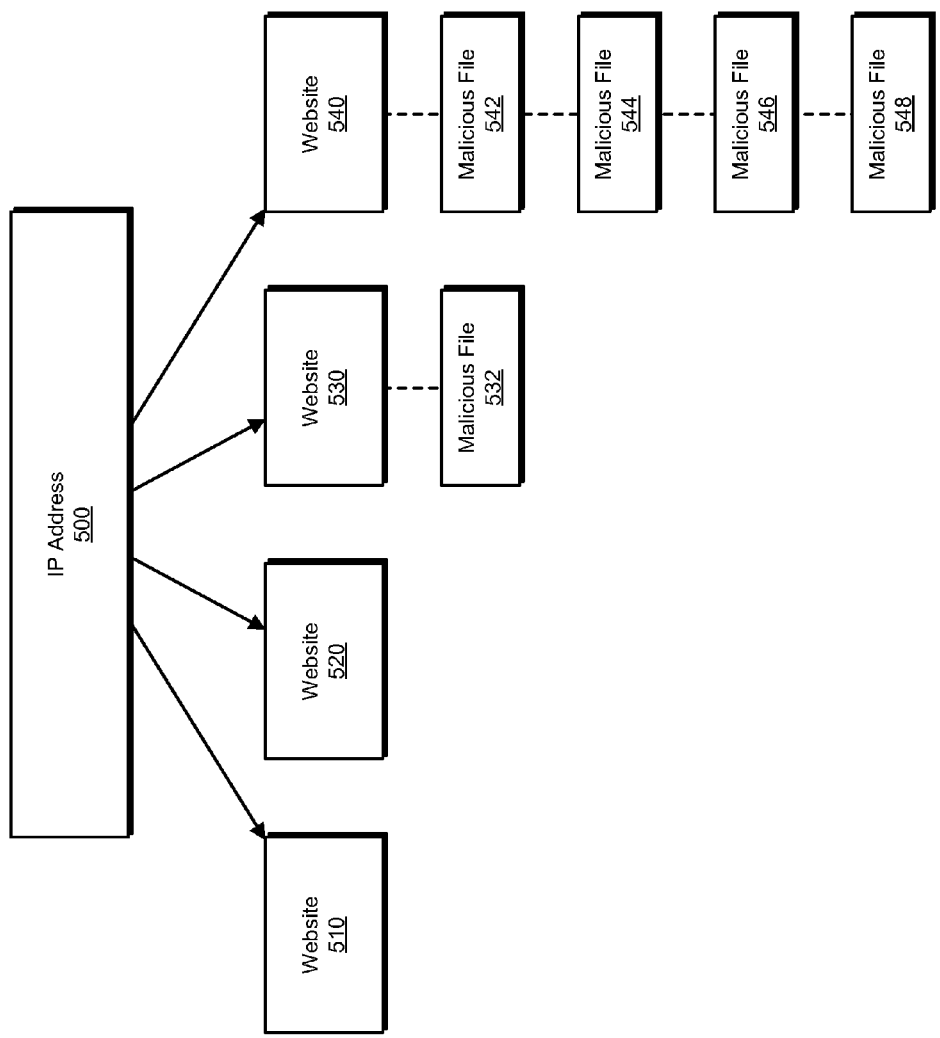
FIG. 5 is a diagram of an exemplary Internet Protocol address.

FIG. 5 illustrates an exemplary IP address 500. As shown in FIG. 5, websites 510, 520, 530, and 540 may operate from IP address 500. Website 510 may have 10,000 file downloads in a 6-month period, with no known bad or suspect files. Website 520 may have 8,000 file downloads in the 6-month period, also with no known bad or suspect files. Website 530 may have 40 file downloads in the 6-month period, including one known malicious file (a malicious file 532). Website 540 may have 30 file downloads in the 6-month period, including four known malicious files (malicious files 542, 544, 546, and 548). In this example, determination module 108 may determine, based on the relatively low proportion of malicious files downloaded from IP address 500 in the 6-month period, based on the relative concentration of observed malicious files from websites 530 and 540, and based on websites 510 and 520 representing a relatively large amount of traffic for IP address 500 while having provided no observed malicious files, that websites 530 and 540 are untrustworthy, but that IP address 500 is not untrustworthy.

In some examples, determination module 108 may identify an amount of time that at least one Internet site has operated from the Internet Protocol address and determine that the amount of time falls below a predetermined threshold. In this case, determination module 108 may determine that the Internet Protocol address is untrustworthy based at least in part on the Internet site being short-lived at the Internet Protocol address. For example, determination module 108 may determine that the Internet Protocol address is untrustworthy at least in part because many short-lived Internet sites have operated from the Internet Protocol address. Because potentially untrustworthy Internet sites that are short lived may be difficult to track, and because short-lived sites may be more likely to be untrustworthy sites, determination module 108 may convict the Internet Protocol address as untrustworthy. This may prevent short-lived sites that rely on the Internet Protocol from evading security actions. This may also more accurately assess the Internet Protocol sites because short-lived sites may be more likely to be untrustworthy sites.

In some examples, determination module 108 may identify one or more of the criteria and/or parameters for determining the trustworthiness of the IP address described herein from configuration information manually generated (e.g., by a security vendor). Additionally or alternatively, determination module 108 may identify one or more of the criteria and/or parameters for determining the trustworthiness of the IP address using a machine learning classifier.

Returning to FIG. 3, at step 310 one or more of the systems described herein may facilitate a security action based at least in part on the trustworthiness of the Internet Protocol address. For example, at step 310 facilitation module 110 may, as part of computing device 202 in FIG. 2, facilitate a security action (e.g., performed by and/or for client system 206) based at least in part on trustworthiness 240 of IP address 210.

Facilitation module 110 may facilitate the security action in any suitable manner. For example, facilitation module 110 may provide information about the trustworthiness of the Internet Protocol to a client system that performs the security action based at least in part on the information. For example, the client system may block access to the Internet Protocol address based on information that the Internet Protocol address is untrustworthy. Additionally or alternatively, the client system may warn a user attempting to access the Internet Protocol address that the Internet Protocol address is untrustworthy. In some examples, the client system may block a file from downloading based at least in part on the file having been observed to have been downloaded from the Internet Protocol address by another client system.

In some examples, facilitation module 110 may facilitate the security action by classifying a file (e.g., as trusted, untrusted, etc.) based at least in part on determining that the file has been downloaded from the Internet Protocol address (e.g., but not from any trusted Internet site).

As explained above in connection with method 300 in FIG. 3, by aggregating security information about files downloaded from an IP address (and, in some examples, about which Internet sites at the IP address originated the file downloads), the systems and methods described herein may determine whether or not an IP address is trustworthy (e.g., as opposed to one or more Internet sites operating from the IP address). These systems and methods may thereby more efficiently and/or accurately block Internet sites and/or files, even when new uniform resource locators and underlying content are quickly created, changed, and/or removed. Furthermore, these systems and methods may scale well by using Internet Protocol addresses as potential nodes of trust at least partly in place of individual Internet sites.

Figure 6:
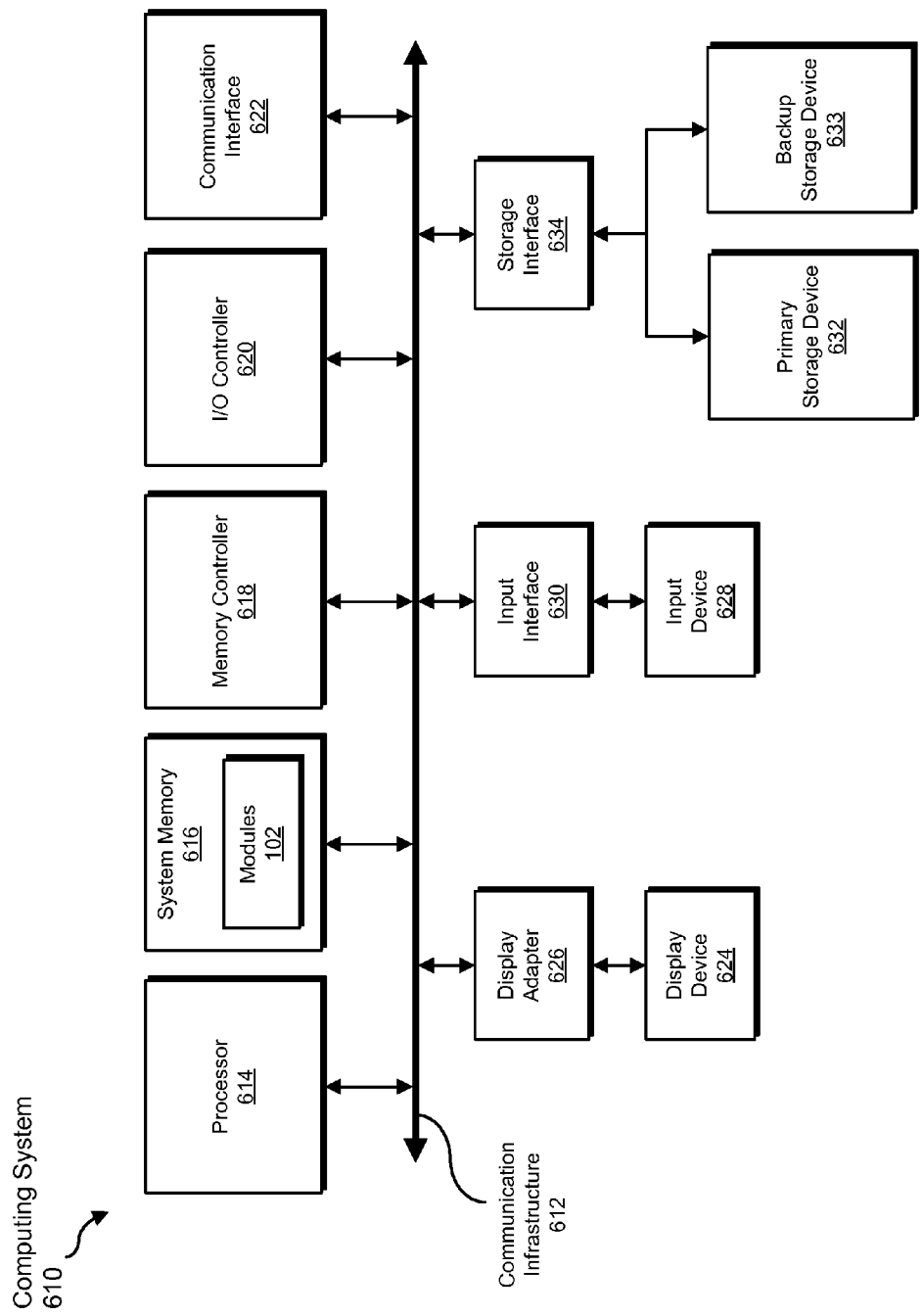
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, generating, determining, facilitating, and providing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
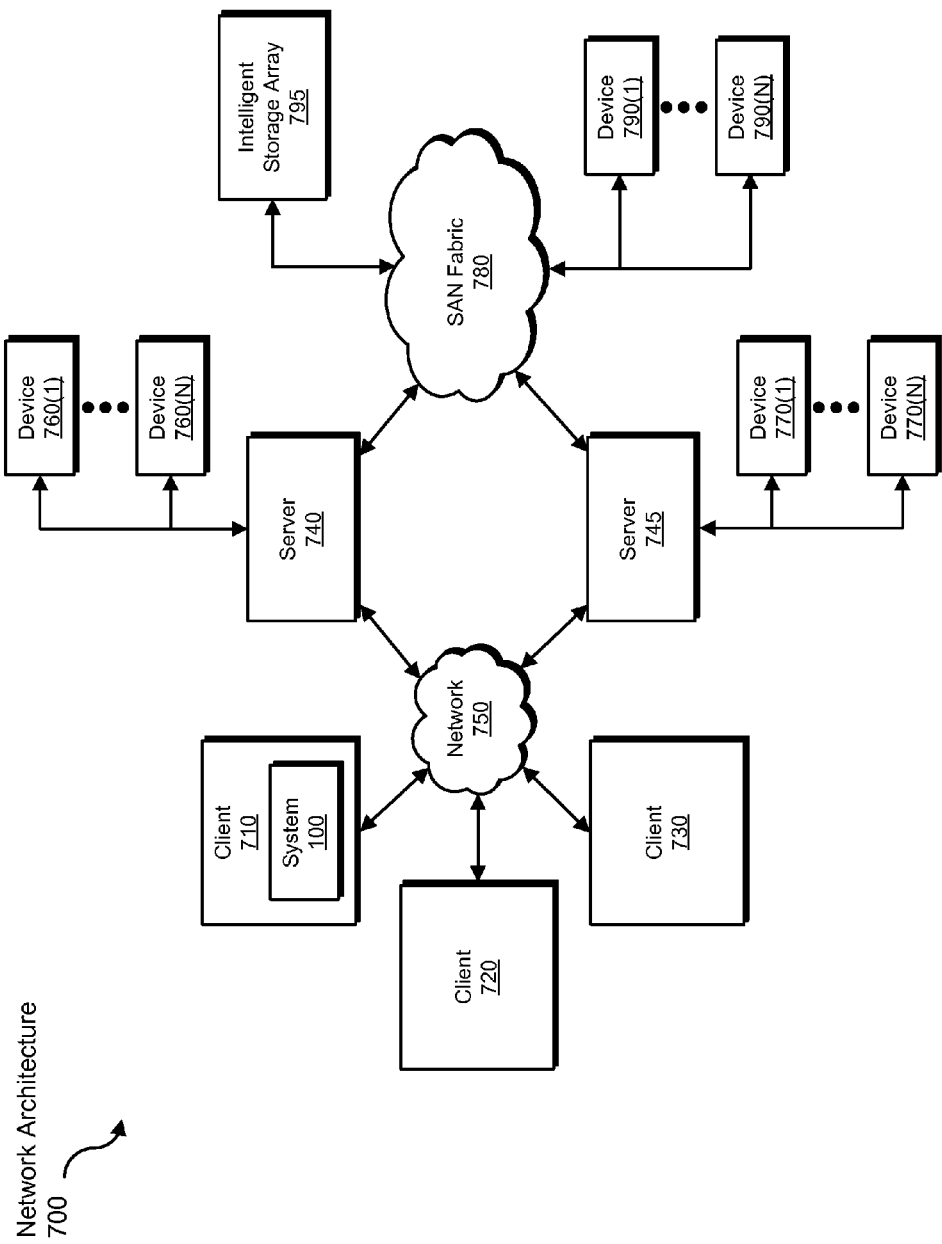
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, generating, determining, facilitating, and providing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for assessing Internet addresses.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file security assessment information to be transformed, transform the file security assessment information, output a result of the transformation to an aggregation, use the result of the transformation to determine the trustworthiness of an Internet Protocol address, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for assessing Internet addresses, at least a portion of the method being performed by a computing device comprising at least one processor, the method comprising:
   identifying an Internet Protocol address;
   identifying a plurality of files downloaded from the Internet Protocol address via a plurality of Internet sites that resolve to the Internet Protocol address;
   generating an aggregation of security assessments that relates to the Internet Protocol address and that is based at least in part on a security assessment of each of the plurality of files, wherein generating the aggregation comprises determining a distribution identifying how the security assessments are distributed across the plurality of Internet sites;
   determining a trustworthiness of the Internet Protocol address based at least in part on the aggregation of security assessments by attributing the aggregation of security assessments to the trustworthiness of the Internet Protocol address as opposed to attributing the security assessments to the plurality of Internet sites by:
      determining that a subset of the plurality of Internet sites accounts for at least a predetermined amount of usage of the Internet Protocol address;
      determining, based on the distribution, that a concentration of negative security assessments within the subset of the plurality of Internet sites falls below a predetermined threshold;
   facilitating a security action based at least in part on the trustworthiness of the Internet Protocol address.

2. The computer-implemented method of claim 1, wherein determining the trustworthiness of the Internet Protocol address based on the aggregation of security assessments comprises determining, based on the distribution, which of the Internet Protocol address and at least one of the plurality of Internet sites to convict as untrustworthy.

3. The computer-implemented method of claim 1, wherein determining the trustworthiness of the Internet Protocol address based on the aggregation of security assessments comprises determining, based on the distribution, that a diffusion of negative security assessments across the plurality of Internet sites exceeds a predetermined threshold.

4. The computer-implemented method of claim 1, wherein determining the trustworthiness of the Internet protocol address is further based on:
   identifying an amount of time that at least one Internet site has operated from the Internet Protocol address;
   determining that the amount of time falls below a predetermined threshold.

5. The computer-implemented method of claim 1, wherein identifying the Internet Protocol address comprises determining that the Internet Protocol address is externally routable.

6. The computer-implemented method of claim 1, wherein facilitating the security action comprises providing information about the trustworthiness of the Internet Protocol to a client system that performs the security action based at least in part on the information.

7. A system for assessing Internet addresses, the system comprising:
   an identification module programmed to identify an Internet Protocol address;
   the identification module is programmed to identify a plurality of files downloaded from the Internet Protocol address via a plurality of Internet sites that resolve to the Internet Protocol address;
   a generation module programmed to generate an aggregation of security assessments that relates to the Internet Protocol address and that is based at least in part on a security assessments of each of the plurality of files, wherein generating the aggregation comprises determining a distribution identifying how the security assessments are distributed across the plurality of Internet sites;
   a determination module programmed to determine a trustworthiness of the Internet Protocol address based at least in part on the aggregation of security assessments by attributing the aggregation of security assessments to the trustworthiness of the Internet Protocol address as opposed to attributing the security assessments to the plurality of Internet sites by:
      determining that a subset of the plurality of Internet sites accounts for at least a predetermined amount of usage of the Internet Protocol address;
      determining, based on the distribution, that a concentration of negative security assessments within the subset of the plurality of Internet sites falls below a predetermined threshold;
   a facilitation module programmed to facilitate a security action based at least in part on the trustworthiness of the Internet Protocol address;
   at least one hardware processor configured to execute the identification module, the generation module, the determination module and the facilitation module.

8. The system of claim 7, wherein the determination module is programmed to determine the trustworthiness of the Internet Protocol address based on the aggregation of security assessments by determining, based on the distribution, which of the Internet Protocol address and at least one of the plurality of Internet sites to convict as untrustworthy.

9. The system of claim 7, wherein the determination module is programmed to determine the trustworthiness of the Internet Protocol address based on the aggregation of security assessments by determining, based on the distribution, that a diffusion of negative security assessments across the plurality of Internet sites exceeds a predetermined threshold.

10. The system of claim 7, wherein the determination module is programmed to determine the trustworthiness of the Internet protocol address is further based on:
    the identification module is programmed to identify an amount of time that at least one Internet site has operated from the Internet Protocol address;
    the determination module is programmed to determine that the amount of time falls below a predetermined threshold.

11. The system of claim 7, wherein the identification module is programmed to identify the Internet Protocol address by determining that the Internet Protocol address is externally routable.

12. The system of claim 7, wherein the facilitation module is programmed to facilitate the security action by providing information about the trustworthiness of the Internet Protocol to a client system that performs the security action based at least in part on the information.

13. A non-transitory computer-readable-storage medium comprising one or more computer-readable instructions that, when executed by at least one processor of a computing device, cause the computing device to:
- identify an Internet Protocol address;
- identify a plurality of files downloaded from the Internet Protocol address via a plurality of Internet sites that resolve to the Internet Protocol address;
- generate an aggregation of security assessments that relates to the Internet Protocol address and that is based at least in part on a security assessment of each of the plurality of files, wherein generating the aggregation comprises determining a distribution identifying how the security assessments are distributed across the plurality of Internet sites;
- determine a trustworthiness of the Internet Protocol address based at least in part on the aggregation of security assessments by attributing the aggregation of security assessments to the trustworthiness of the Internet Protocol address as opposed to attributing the security assessments to the plurality of Internet sites by:
  - determining that a subset of the plurality of Internet sites accounts for at least a predetermined amount of usage of the Internet Protocol address;
  - determining, based on the distribution, that a concentration of negative security assessments within the subset of the plurality of Internet sites falls below a predetermined threshold;
- facilitate a security action based at least in part on the trustworthiness of the Internet Protocol address.

14. The non-transitory computer-readable-storage medium of claim 13, wherein determining the trustworthiness of the Internet Protocol address based on the aggregation of security assessments comprises determining, based on the distribution, which of the Internet Protocol address and at least one of the plurality of Internet sites to convict as untrustworthy.

15. The non-transitory computer-readable-storage medium of claim 13, wherein determining the trustworthiness of the Internet Protocol address based on the aggregation of security assessments comprises determining, based on the distribution, that a diffusion of negative security assessments across the plurality of Internet sites exceeds a predetermined threshold.

16. The non-transitory computer-readable storage medium of claim 13, wherein determining the trustworthiness of the Internet Protocol address is further based on:
- identifying an amount of time that at least one Internet site has operated from the Internet Protocol address;
- determining that the amount of time falls below a predetermined threshold.

17. The non-transitory computer-readable storage medium of claim 13, wherein identifying the Internet Protocol address comprises determining that the Internet Protocol address is externally routable.

18. The non-transitory computer-readable storage medium of claim 13, wherein facilitating the security action comprises providing information about the trustworthiness of the Internet Protocol to a client system that performs the security action based at least in part on the information.

* * * * *